Dec. 9, 1969 — S. B. BOSTER — 3,482,790
COFFEE MILL
Filed Aug. 16, 1967
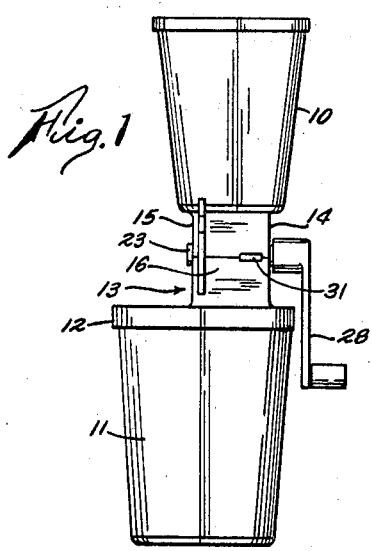
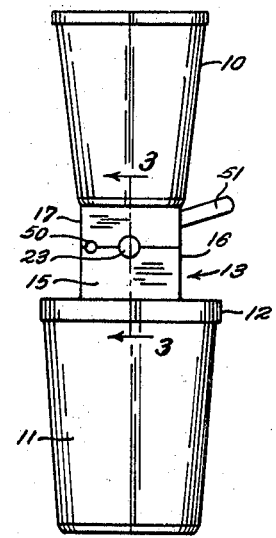
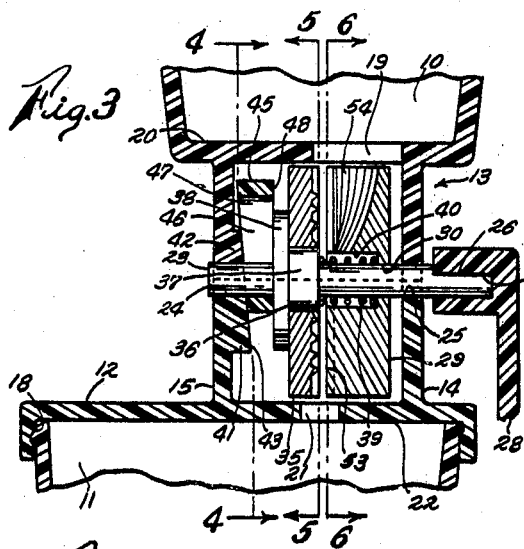
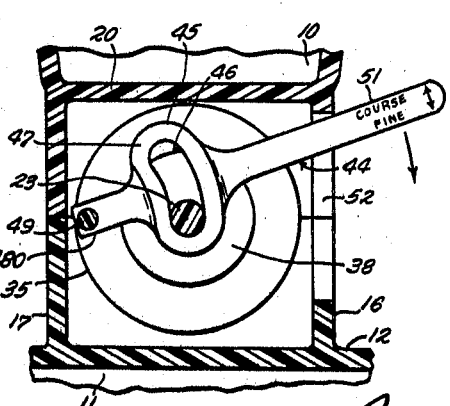
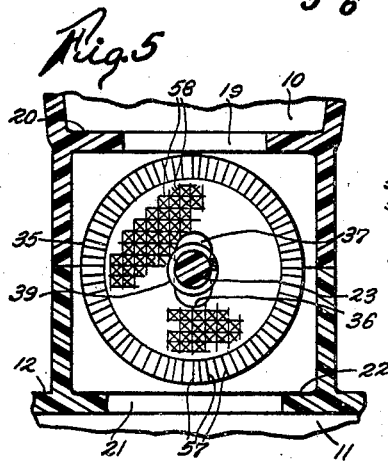
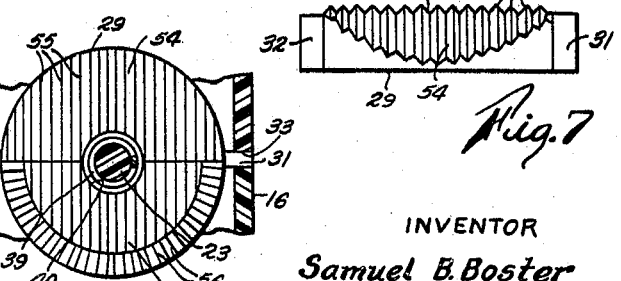
INVENTOR
Samuel B. Boster
BY
ATTY.

United States Patent Office 3,482,790
Patented Dec. 9, 1969

3,482,790
COFFEE MILL
Samuel B. Boster, 7304 Reading Road,
Cincinnati, Ohio 45237
Filed Aug. 16, 1967, Ser. No. 661,125
Int. Cl. B02c 7/06, 7/04
U.S. Cl. 241—256                3 Claims

ABSTRACT OF THE DISCLOSURE

A coffee mill having a rotatable granulating member and a stationary granulating member that cooperate to form a downwardly and laterally restricted bean crushing pocket and a coffee grinding zone beneath the pocket. A grind selector means that secures gradual and continuous adjustments of said granulating members to obtain a large selection of coffee grinds from "course" to "fine" grades.

---

The present invention relates to improvements in coffee mills and is particularly directed to a greatly simplified mill structure that affords a relatively inexpensive, yet effective and rugged coffee bean grinder for use in household kitchens, or the like.

An object of the invention is to provide a coffee bean grinder that is constructed and the parts arranged to permit manufacture of all but its grinding members from suitable plastic materials.

Other objects of the invention are to provide in a coffee mill having the foregoing characteristics a novel selector means for gradual and continuous adjustments of the granulating members to secure a large number of coffee grinds from "coarse" to "fine" grades; a novel set of coffee bean crushing and granulizing teeth on the cooperative faces of the opposed granulating members; and a small number of extremely simplified parts that cooperate to produce a practical, inexpensive utensil.

Further objects will be apparent from the following specification when read in conjunction with the accompanying drawings, wherein:

FIG. 1 is a side elevational view of my coffee mill.

FIG. 2 is a rear elevational view of the coffee mill as shown in FIG. 1.

FIG. 3 is an enlarged sectional view taken on line 3—3 of FIG. 2.

FIG. 4 is a section taken on line 4—4 of FIG. 3.

FIG. 5 is a section taken on line 5—5 of FIG. 3.

FIG. 6 is a fragmental, section taken on line 6—6 of FIG. 3.

FIG. 7 is a top plan view of the granulating member shown in elevation in FIG. 6.

Referring to the drawings in detail, the device constituting the present invention comprises an upper coffee bean container 10, a lower granulized coffee receptacle 11 closed by a lid 12, and an intermediate granulizing chamber 13. The chamber 13 is formed by a front end wall 14, a rear end wall 15 and opposed side walls 16 and 17; the upper halves of said walls and the coffee bean container 10 being of a one-piece molded plastic material while the lower halves of said walls are constructed of a one-piece plastic material with the lid 12 of the granulated coffee receptacle 11. The coffee bean container is preferably open at the top while the lid 12 has a screw type severable connection 18 (FIG. 3) with the top marginal edge of the receptacle 11. As best shown in FIGS. 3 and 5 the chamber 13 has a coffee bean inlet opening 19 formed in its top wall 20 and a granulized coffee outlet opening 21 formed in its bottom wall 22.

As best shown in FIGS. 1 and 2 of the drawings, the confronting edges of the upper and lower halves of the walls for the granulizing chamber 13 meet in a horizontal plane which contains the axis of a rotatable shaft 23 and said edges are permanently secured together by a suitable plastic adhesive after the granulizing mechanism has been assembled in the chamber. The shaft 23 is positioned for controlled axial movement across the granulizing chamber 13 by means of bearings 24 and 25 (FIG. 3), each formed in both halves of the end walls 14 and 15, respectively. One side of the shaft projects beyond its end wall 14 and is provided with a flat 26 that slidably keys into an irregular hole 27 formed in a removable crank handle 28.

A first stationary granulizing member 29 is preferably circular in elevation (FIG. 6) and is provided with a centrally located hole 30 through which the shaft 23 freely passes. The member 29 is mounted in the front end of the chamber 13 against movement by means of two opposed, longitudinally extending ribs 31 and 32, which project into slots 33 and 34, respectively, each formed in the cemented edge portions of both halves of the chamber side walls 16 and 17, respectively.

A second rotary granulating member 35 is disc-shaped in elevation (FIG. 5) and has an irregular, oval-shaped hole 36 formed centrally through the hub portion thereof which is keyed to a similarly shaped shoulder 37 formed of an intermediate portion of the shaft 23. The outer face of the member 35 abuts against an enlarged, circular shoulder 38, also formed on the intermediate portion of the shaft. An expansile coil spring 39 encircles the shaft and is partly received in an enlarged circular recess 40 in the member 29 disposed coaxial with the hole 30 therein; said spring having an outside diameter greater than the small diameter of the shoulder 37 so that the end coil of the spring is in engagement with the shoulder 37 and with the granulating face of the member 35 (FIG. 5), the opposite side of the spring bearing against an internal shoulder formed in the member 29 between the hole 30 and the recess 40. Spring 39 therefore biases the first granulating member 29 and the second member 39 toward coaxial, spaced apart positions and such positions may be varied gradually and continuously from the "coarse" grind positions shown in the drawings to a "fine" grind position by means of a grind selector means which will now be described.

The grind selector means is disposed in the rear end of the chamber 13 and comprises projecting portions 41 and 42 that are one-piece with the respective halves of the wall 15, said portions being formed by thickening the wall halves around the bearing 24 and formed with a composite, planar cam face 43 that is inclined downwardly and inwardly from said wall. A cooperating cam member 44 has an enlarged camming portion 45 provided with an arcuate slot 46 for freely receiving the shaft 23, said enlarged portion having an inclined face 47 in sliding engagement with the cam face 43 on the wall 15, while an opposed lateral wall 48 on the member 44 is in sliding engagement with the outer face of the shoulder 38 on the shaft 23. As best shown in FIG. 4 an arm 480 extends from one side of the enlarged portion 45 and is provided with a laterally extending pin 49 which is pivotally mounted for axial sliding movement in a bearing hole 50 (FIG. 1) formed in the rear end wall 15 of the granulizing chamber 13. A long lever 51 is integral on the opposite side of the enlarged portion 45 and projects through a slot 52 formed in the chamber side wall 16.

With reference to FIGS. 3, 6 and 7 of the drawings, it will be noted that the granulating face on the first member 29 has a flat lower grinding portion 53 disposed at right angles to the shaft 23 and a circular, upper crushing portion 54 flaring upwardly to the top thereof, both said portions being provided with upstanding, laterally spaced apart rows of V-shaped teeth 55, while the flat lower portion 53 of said member has formed in the periphery thereof, a semi-circular row of radially elongated and angularly spaced apart V-shaped teeth 56.

Now with reference to FIGS. 3 and 5 it will be seen that the granulating face of the second member 35 has a flat face disposed at right angles to the shaft 23 and provided at its outer periphery with a circular row of radially elongated and angularly spaced apart V-shaped grinding teeth 57 while the central portion of the face within the row has pryamidic crushing teeth 58 disposed in straight parallel rows at right angles to each other.

In operation the coffee mill is set up as shown in FIGS. 1 and 2 and the container 10 is filled with coffee beans to be ground. The grind selector lever 51 is then manually pivoted "up" or "down" to a selected grind, such pivotal action camming the shaft 23 axially and setting the relative positions of the first and second granulating members and thereafter the handle 28 is grasped and turned. The coffee beans fall by gravity through the inlet opening 19 into a downwardly and laterally restricted bean crushing pocket constituted by the pyramidic crushing teeth 58 on the rotated, second granulating member 35 and the upstanding V-shaped crushing teeth 55 on the circular and outwardly flaring upper portion 54 of the first granulating member 29. The crushed beans fall by gravity between the circular row of grinding teeth 57 on the rotated second granulating member 35 and the opposed semi-circular row of grinding teeth 56 on the lower portion of the first granulating member 29 where the crushed beans are ground to the required size, the comminuted coffee passing through the outlet 21 and collected in the receptacle 11.

What is claimed is:
1. A coffee mill comprising
   a granulizing chamber having front end, rear end and side walls,
   a wide coffee bean inlet formed in the top of the chamber,
   a relatively narrow granulized coffee outlet at the bottom of the chamber in vertical alignment with the coffee bean inlet,
   a rotary shaft positioned for controlled axial movement across the central portion of the chamber and having its bearings in the said end walls, the end of the shaft projecting beyond the front wall,
   a handle connected to the projected end of the shaft,
   a first granulating member mounted within the front end of the chamber and having a centrally disposed hole for freely receiving the shaft, said first member having a granulating face with a flat lower portion disposed at right angles to the shaft and an upper portion inclined upwardly and forwardly and terminating below the forward edge of the coffee bean inlet,
   a second disc-shaped granulating member having a hub portion fixed on the shaft and having a granulating face lying in a plane normal to the shaft and disposed beneath the rear edge of the coffee bean inlet, and
   a grind selector means in the rear end of the chamber to axially adjust and hold the second granulating member relative to the first granulating member.

2. A coffee mill as set forth in claim 1 characterized by the fact that the granulating face portions of the first granulating member are provided with upstanding, laterally spaced apart rows of crushing and grinding teeth.

3. A coffee mill as set forth in claim 1 characterized by the fact that the second member has crushing and grinding teeth on its granulating face.

References Cited
UNITED STATES PATENTS

| | | | |
|---|---|---|---|
| 117,879 | 8/1871 | Garfield | 241—256 |
| 159,517 | 2/1875 | Lane | 241—256 |
| 543,967 | 8/1895 | Poulson | 241—256 |
| 679,775 | 8/1901 | Pank | 241—256 |
| 1,306,610 | 6/1919 | Morgan | 241—256 |
| 1,496,613 | 6/1924 | Asbury | 241—256 |
| 1,629,377 | 5/1927 | Buckwalter | 241—256 |
| 2,692,733 | 10/1954 | Eastwood | 241—256 |
| 2,900,140 | 8/1959 | Schuhmann et al. | 241—256 |

GERALD A. DOST, Primary Examiner

U.S. Cl. X.R.
241—239